United States Patent [19]

Stenemann

[11] 4,345,849
[45] Aug. 24, 1982

[54] FRAMEWORK OF RELEASABLY-CONNECTABLE BARS

[75] Inventor: Bruno Stenemann, Beckum, Fed. Rep. of Germany

[73] Assignee: Octanorm-Vertriebs GmbH für Bauelemente, Filderstadt, Fed. Rep. of Germany

[21] Appl. No.: 190,388

[22] Filed: Sep. 24, 1980

[30] Foreign Application Priority Data

Oct. 10, 1979 [DE] Fed. Rep. of Germany ....... 2941008

[51] Int. Cl.³ .......................... F16B 7/04; F16B 12/20
[52] U.S. Cl. ..................................... 403/252; 403/257
[58] Field of Search .............. 403/252, 264, 255, 254, 403/187, 230, 240, 257, 256, 248

[56] References Cited

U.S. PATENT DOCUMENTS 2,855,255 10/1958 Sonderstrap ..................... 403/256

FOREIGN PATENT DOCUMENTS 7341203 6/1975 Fed. Rep. of Germany .
2732910 2/1979 Fed. Rep. of Germany ...... 403/252

*Primary Examiner*—Andrew V. Kundrat
*Attorney, Agent, or Firm*—Burns, Doane, Swecker & Mathis

[57] ABSTRACT

A framework comprises bars coupled together by a coupling carried by some of the bars (carrier bars). The other bars have undercut longitudinal slots which receive coupling ends of the coupling. The coupling includes a bearing member on which is mounted an eccentric member which is rotatably accessible from one face of the bar, and a holding member which can be displaced longitudinally and laterally in response to rotation of the eccentric member. The holding member has a hook-shaped coupling end which, in the coupled position, engages in the undercut longitudinal slot in the other bar. The holding member comprises a tongs-shaped leaf-spring comprising a pair of arms joined at one end by a web. The leaf-spring surrounds the bearing member. The holding member includes a recess for housing the eccentric member. The outer end of the bearing member has a wedge portion which extends as far as the longitudinal slot in the other bar when the bars are connected. An inside surface of the leaf-spring is engaged by the eccentric member whereby the arms of the leaf-spring can be forced against the wedge to spread the arms apart and into locking engagement with the slot of the other bar.

14 Claims, 8 Drawing Figures

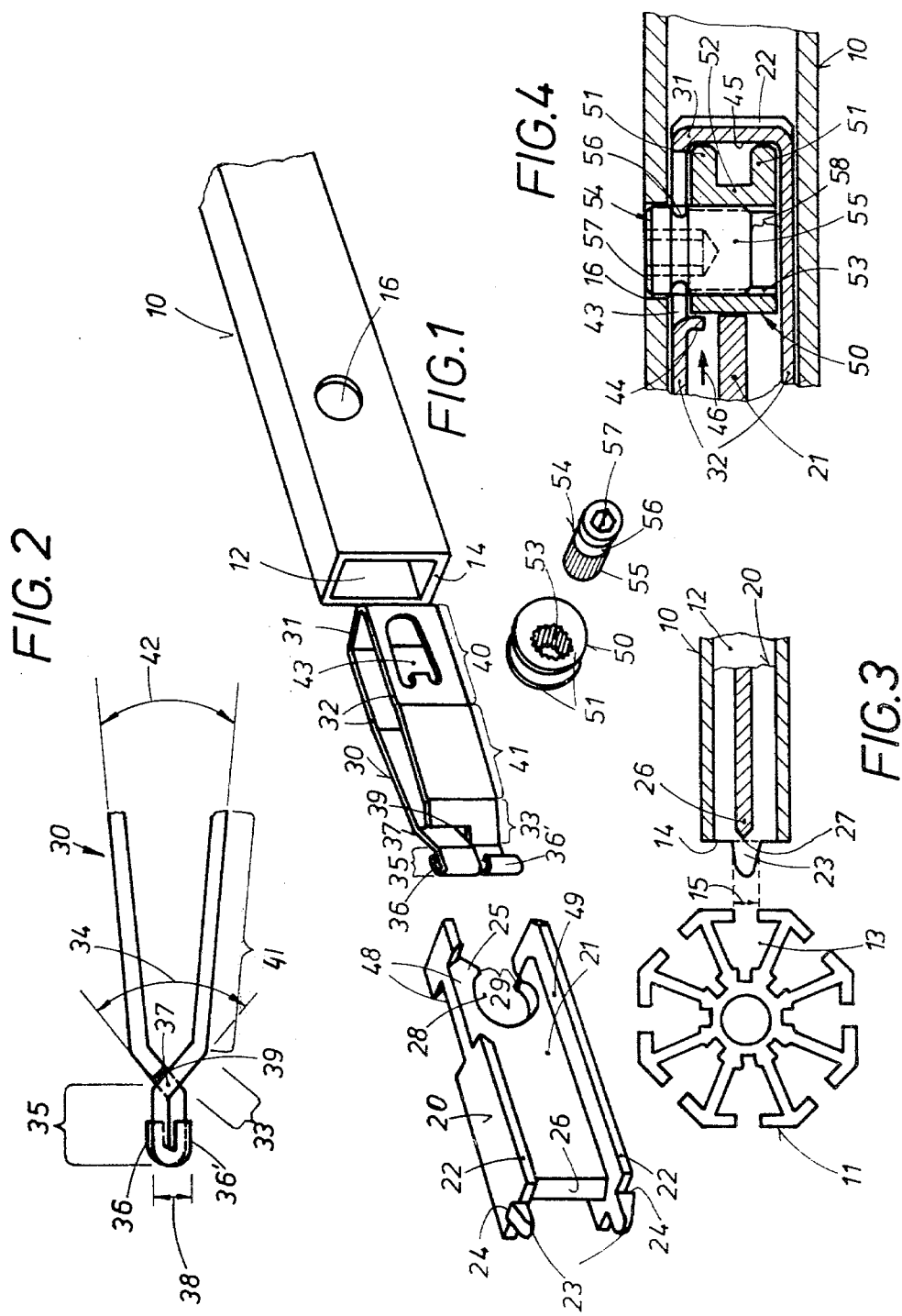

FRAMEWORK OF RELEASABLY-CONNECTABLE BARS

BACKGROUND AND OBJECTS OF THE INVENTION

The invention relates to a framework formed of separate interconnected profile bars. At least some of the bars have undercut longitudinal slots of T-shaped cross-section into which extend coupling ends of coupling members projecting from the end faces of other profile bars. The coupling members comprise a bearing member supporting a transversely oriented eccentric member that is rotatingly operable from one long side of the profile. A holding member is mounted on the bearing member and is displaceable by the eccentric member so as to be displaced laterally by control faces. The holding member has a hook-shaped coupling end which, in a bar-coupling condition, engages behind the longitudinal wall of the slot to secure the bars together.

A known frame of this type is disclosed in German Utility Model No. 73 41 203 wherein a plate-shaped holding member is provided on its inner end and in its front zone with sloping shoulders. Cooperating control faces are disposed on the bearing member which has a U-shaped profile. By rotation of the eccentric member, the two sloping shoulders on the holding member are lifted in relation to the control faces of the bearing member, against the action of an auxiliary leaf-spring. These components which are used for coupling the profile bars in the frame are expensive, do not move easily and do not provide a sufficiently reliable coupling connection.

The present invention is intended to solve the problem of achieving a simple connection of the profile bars in such a framework, which connection is economically achievable and nevertheless being characterized by a high degree of dependability.

SUMMARY OF A PREFERRED EMBODIMENT OF THE INVENTION

According to the invention, the bearing member has a longitudinal central wall around which there engages a tong-shaped leaf-spring. The leaf-spring comprises a pair of holding elements. The bearing member has at an inner end region of its wall a cut-out for mounting the eccentric member and is provided at an outer wall end with a two-sided stationary wedge. In a coupling situation, the wedge extends as far as a longitudinal slot of a bar to which it is to be coupled. The web of the U-shaped leaf-spring forms by means of its inner surface, a working face which is directed towards the eccentric member. The two arms of the leaf-spring have, in the region of the wedge, convergent sloping portions which can be spread apart by the wedge when the leaf-spring is displaced by the eccentric member.

Preferably, the longitudinal central wall of the bearing member performs numerous functions. Firstly, it determines the location of the leaf-spring which engages around it, serving then to mount the eccentric member. The central wall is also a guide member for the leaf-spring during its displacement by the eccentric member. The wedge at the front end of the central wall serves as a driving means to spread apart the arms of the leaf-spring on which there are the hook-shaped ends capable of establishing a coupling connection. Although the bearing member and its wedge are stationary, the spreading apart effect occurs by virtue of the inward movement of the leaf-spring occasioned by the eccentric member and occuring purely by virtue of the fact that the eccentric member is disposed in the region of the apex between the two arms of the U-shaped leaf-spring and is supported on the inside on the web at the apex thereof. The U-shaped form of the leaf-spring is chosen primarily by reason of the explitable spring elasticity of its arms which are capable of making a coupling connection. The leaf-spring provides in its apex zone the vital working surface for the eccentric member and, at the same time, provides for a particularly simple formation of a pair of holding members which are joined together from the outset and in conjunction with the aforementioned special bearing member decisely facilitates assembly. Although this means that a double holding member and therefore a particularly dependable coupling between the profile bars can be achieved, it is possible to achieve this with relatively minimal space. At the same time, the contact of the eccentric member against the inner wall end of the bearing member is located far from the end of the profile bar which is important to convenient handling of the eccentric member during assembly and dismantling of the frame because interferance caused by the intersecting bars themselves is avoided. The wedge, on the other hand, is located at the opposite end of the longitudinal central wall of the bearing member, in other words as far as possible towards the end of the profile bar; thus the effect of spreading apart of the arms of the U-shaped spring takes place exactly at the point at which it is decisively important, namely at those portions of the arms which are provided with oppositely directed hook ends and which engage behind the longitudinal slot on the other profile bar.

When the eccentric member is relaxed, the hook ends of the arms of the U-shaped spring are pushed as far as possible out of the profiled interior of the bar and by virtue of the aforesaid spring elasticity, they are automatically compressed into the narrowest space. Thus, the initial insertion of these ends into the longitudinal slot in a matching profile bar to which the bar is to be connected is simple. In this uncoupled position, if the sloping portions of the arms of the U cross one another in front of the tip of the wedge on the bearing member so that their hook ends are directed towards each other, a particularly space saving initial position of the hook-shaped coupling ends can be achieved. This effect is achieved particularly if these ends are vertically offset in relation to one another and lie in each case in a free space cut into the adjacently disposed arm. The width of opening of the longitudinal slot can thereby be kept small, which results in a stable and substantially closed profile form. During the course of movement caused by the eccentric member control, the coupling ends of the pair of holding members are not only spread apart so that their hook ends move into the undercut in the longitudinal slot but they are also moved axially inwardly so that there is a pressing of the engaged longitudinal wall of the slot in the matching profile bar against the head end of the profile bar which receives the pair of holding members. The location and the acute angle of the wedge determine thereby the degree of opening of these two holding members in relation to each other and with regard to their push-in movement.

In order to assist the coupling effect and particularly to simplify assembly of the frame, coupling studs are located in front of the head end of the profile bars and, as viewed in the uncoupling position, above and below the coupling ends of the arms of the U-shaped spring. The coupling studs, in a coupling mode, project into the aperture in the longitudinal slot and thus produce proper orientation of the bars in relation to each other. The bearing member can also be used for this purpose because the coupling studs can be integrally molded directly on it. A conical shape for the studs ensures a good fit of these coupling studs in the longitudinal slot.

If the bearing member is constructed as a profile member having a double T-cross-section, i.e., an I-shape, the web of the T will form the aforesaid particular longitudinal central wall. Apart from the simple form of such a bearing member, the flanges of the T provide for a secure seating of the bearing member and of the further components mentioned within the cavity in the profile bar which accommodate them. In the case of a rectangular tube profile, the T flanges are braced against opposite disposed narrow walls of the tube. They serve at the same time to guide the U-shaped leaf-spring which is situated between them. A slot at the rear wall of the web of the T of this longitudinal central wall provides the aforesaid cut-out for mounting of the eccentric member. A narrowing of that slot in relation to the diameter of the rotary bearing of the eccentric member guarantees simple assembly and a convenient fit of the parts into the bar profile. The flanges of the T can, on the one hand, be provided with cut-outs to permit considerable travel of the eccentric member and can, on the other hand, provide stops to limit a specific angle of rotation of the eccentric member.

THE DRAWING

Further measures and advantages of the invention will become evident from the appending claims and from the ensuing detailed description, which makes reference to an example of embodiment of the invention. In the drawings:

FIG. 1 shows in an exploded view and, prior to assembly, the elements vital to the coupling of a not-illustrated profile bar and which have to be accommodated in the hollow profile interior of an illustrated profile bar;

FIG. 2 is a fragmentary view, in plane, of a leaf-spring component of the coupling;

FIG. 3 depicts one bar, with its coupling, approaching another bar, the one bar depicted in longitudinal section and the other bar depicted in cross section;

FIG. 4 shows in a greatly enlarged scale, a longitudinal section through a portion of the coupling elements accommodated in the hollow profile interior of a bar;

DETAILED DESCRIPTION OF A PREFERRED EMBODIMENT OF THE INVENTION

Figure 5A:
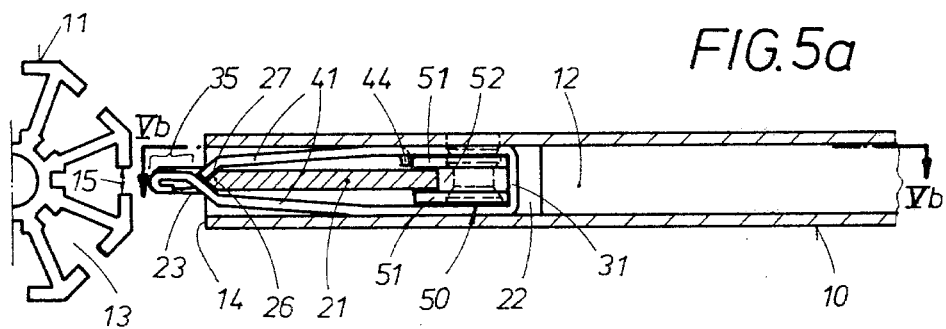
FIG. 5a is a longitudinal sectional plan view of the profile bars which are to be coupled, one bar carrying coupling elements in their uncoupled position.

Of the frame according to the invention, the drawings show only those parts of the two profile bars 10, 11 (FIG. 3) which are to abut, the illustration made at the place where they are to be separably connected. One bar 10 is, in the present case, provided with a hollow profile while the other bar 11 is constructed as an octagonal column having on its sides T-shaped undercut longitudinal slots 13. The cavity 12 in the hollow profile bar 10 serves to receive members 20, 30, the appearance of which can best be seen in FIG. 1.

Member 20 is a bearing member which is constituted by a profile piece of double T-shaped cross-section. The web of the T (in the inserted condition), forms a longitudinal central wall 21 in the cavity 12 in the bar 10. The profile of the bearing member 20 is adapted to suit the interior rectangular cross-section of the cavity 12, which is why the flanges 22 of the T in the profile of the bearing member 20 bear against the inner faces of the upper and lower profile walls of the bar 10 and have their edges braced against the side walls of the bar 10. In the inserted condition, as can be seen best in FIGS. 3 and 5b, coupling studs 23 integrally molded on the bearing member 20 protrude beyond the head end 14 of the hollow profile bar 10. The bearing member 20 is constructed in one piece as an injection molded part, preferably being molded from an elastic material, in particular synthetic plastics material. The coupling studs 23 are of conical shape, their base (as FIG. 3 shows) being adapted to suit the inside width of a slot aperture 15 in the bar 11. In the coupling condition shown in FIGS. 6a and 6b, therefore, the coupling studs 23 are seated with a press fit in the slot aperture 15. In the direction of the flanges 22 of the T, the coupling studs 23 are provided with a step 24 which, in the fitted position, bears against the end face 14 of the hollow profile bar 10, as FIG. 5b shows. This establishes the depth of insertion of the bearing member 20 in the hollow profile space 12 of this bar 10.

In the inserted condition, the longitudinal central wall 21 of the bearing member 20 has engaging around it a holding member 30 which is of tong-shaped construction comprising a U-shaped leaf-spring, the appearance of which can best be seen in the view of the components in FIG. 1. The loop of the U, in the assembled condition, according to FIG. 5a, engages around the inner wall end 25 of the longitudinal central wall 21 of the bearing member 20. In the assembled condition the two arms 32, 32 of the U-shaped spring extend initially along the two wall sides of this longitudinal central wall before converging in front of a wedge 26 integrally formed at the outer end of the longitudinal central wall 21. For this purpose, the arms 32 of the U-shaped spring have a front part with sloping portions 33 which produce this convergence and which, according to FIG. 2, enclose an angle 34 of convergence of preferably 80°. In the assembled condition as shown in FIG. 3, the tip 27 of the wedge 26 lies in the plane 14 of the end faces 14 and therefore in the coupling position of the members 20, 30, protrudes as far as the slot aperture 15 as shown in FIGS. 6a and 6b.

As can be seen most clearly in FIG. 1, adjacent the sloping portions 33 of the arms of the U-shaped spring are arm ends 36 which are provided with oppositely directed hook ends 36, 36'. Although for implementation of the invention it is sufficient if the two arm ends 35 bear on each other back-to-back so that their two hook ends are directed away from each other, it is more advantageous for a slender overall shape, as is best shown in FIG. 2, to produce an intersecting relationship in the starting position which characterizes the uncoupled position. In front of the point of intersection 37 indicated in FIG. 2, the arm ends 35 extend with mutually facing hooks 36, 36', resulting in an extremely narrow overall width 38 which, in the assembled condition, remains within a vertical contour corresponding to the aforesaid coupling studs 23 of the bearing member 20, as can best be seen by reference to the uncoupled position of the members in FIG. 5a. This slender overall width 38 of the arm ends 35 which can establish the coupling permits of particularly narrow slot openings 15 in the profile column 11, which is why despite the numerous longitudinal slots 13, the column 11 forms a substantially closed profile when viewed from the outside. In this starting condition, the two hook ends 36, 36' are located in a vertical longitudinal staggered relationship with respect to each other, between the two coupling studs 23 on the bearing member side. For this longitudinal staggering, the two hook ends 36, 36' are offset in their height in relation to each other and the corresponding areas of the two arm ends 35 are provided in each case with a cut-away portion 39 into which, in the starting position, the end of the oppositely disposed arm can be accommodated.

In the assembled condition, an eccentric member 50 which takes the form of a reel of yarn, is fitted into a rear portion 40 of the two arms 32 of the U-shaped spring, such rear portion expediently extending parallel with the side walls of the hollow profile bar 10. As is most clearly seen in FIG. 5a, a cam plate 51 comes to rest against the two inner faces of these portions 40 of the arms, the cam plates being connected to each other by a bearing stud 52. For assembly purposes, the eccentric member 50 is simply placed into the loop end of the U-shaped leaf-spring 30 from above or below and is pushed together with the latter from the inner wall end 25 over the bearing member 20 until finally the bearing stud 52 comes to rest in a slot-like cut-out 28 in the longitudinal central wall 21 which forms a rotary bearing for the eccentric member 50. As can be seen in FIG. 1, the slot end 29 is narrowed in respect of the bearing space in the cut-out 28, so that the bearing stud 52 is secured in the assembled location once it has traversed this narrowed portion. For assembly purposes, the slot end 29 is furthermore provided at the rear with beveled guide faces for introduction of the bearing stud 52 of the eccentric member 50. By virtue of the bearing member 20 being constructed from an elastic material, particularly synthetic plastic, resilient deformations can occur at the narrowed portions at the slot end 29 to facilitate assembly.

During assembly of the U-shaped leaf-spring 30 on the bearing member 20 in connection with the eccentric member 50, the arms 35 are pressed apart by the central wall 21 and travel along the two side faces of the longitudinal central wall 21 until they arrive in front of the tip 27 of the wedge, whereupon their inclined portions 33 snap toward one another and are held by the inherent elasticity in the U-shaped spring 30. A feature which contributes to this spring elasticity comprises the longitudinal portions 41 of the two arms 32 of the U-shaped spring which diverge at a relatively flat angle 42. In this pre-assembly condition, the members 20, 30, 50 form one structural unit which can be handled as a whole. The U-shaped leaf-spring 30 is held between the two flanges 22 of the T of the bearing member 20 and its rear U-shaped loop engages around the eccentric member disposed in the cut-out 28 in the longitudinal central wall 21 so that the eccentric member is held captive.

This unit can now be pushed from the head end 14 into the cavity 12 in the hollow profile bar 10 until the steps 24 on the studs 23 abut the bar 10. Then an actuation portion 53 of the eccentric member 50 is aligned with a lateral aperture 16 in the hollow profile bar 10. This aperture 16 is remote from the head end 14 of the bar by a distance sufficient to permit comfortable handling. For actuation of the eccentric member 50, also one arm 32 of the U-shaped leaf-spring 30 is provided with a window 43. In the present case, manipulation of the eccentric member occurs indirectly via an insert 54 which is passed laterally through the aperture 16 in the bar 10 into the actuation portion 53 in the eccentric member 50. The actuation portion 53 is preferably constructed as a recess into which the insert 54 can fit. For a rotationally rigid connection, the end 55 of the insert 54 on the one hand and the housing 53 in the eccentric member on the other are provided with matching shapes, e.g., square or hexagonal cross-sections. In the present case, this rotationally rigid connection is provided by a gear profile on the end 55 of the insert 54 while the housing 53 has a corresponding system of internal serrations.

The fully assembled condition of the components of bar 10 can be seen most clearly in FIG. 4 where the insert end 55 which has external teeth is inserted into the internally toothed housing 53. The insert 54 is provided with an encircling groove 56 which is so dimensioned that it has to be snapped into the narrower window 43 in the arm 32 of the U-shaped leaf-spring. An actuating end 57 of the insert 54 which is disposed in front of this groove 56 remains in the aperture 16 in the profile bar 10, thus ensuring a secure locking of the unit in relation to the bar 10.

The aforesaid unit 20, 30, 50 is, via the insert 54, captively connected to the profile bar 10. However, separation of this component can easily be brought about in the following way. A hammer tap on the actuating end 57 of the assembled insert 54 allows the latter to be pressed fully through the window 43 in the arm and into the space between the two arms 32 of the U-shaped leaf spring because in the assembled condition there is sufficient space 58 behind the insert 54 and in the housing 53. For this purpose, the actuating end 57 does not have a larger cross-section than the toothed end 55. Once the insert 54 has been pushed-in in this way, the component 20, 30, 50 can simply be removed from the cavity 12 in the profile bar 10 by extraction from the end 14. Thus, it is convenient to interchange constituent parts of the connection or to use the connecting members on other bars. Instead of such a space 58, it would also be possible to provide a lateral aperture 16 in both side walls of the tubular profile 10, so that in order to effect dismantling, the insert 54 could be pushed-out through the window 43 in the arm of the U-shaped leaf-spring 30 in the opposite direction to that in which it is inserted. The profile form, particularly the toothed profile between eccentric member 50 and insert 54 permits easy assembly and also dismantling of the component unit from the tubular profile bar 10.

Figure 5B:
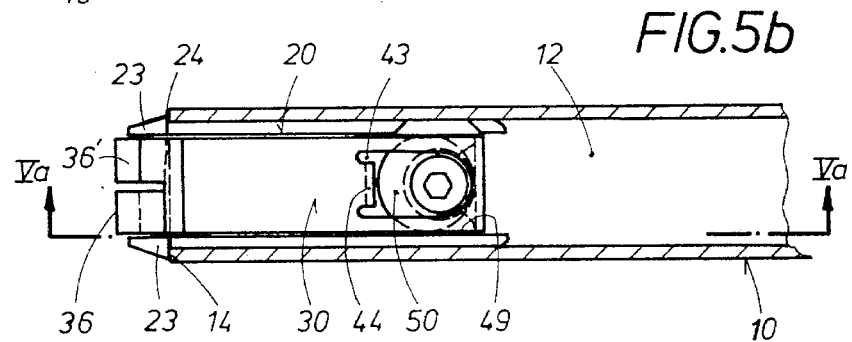
FIG. 5b is a longitudinal sectional side view through the coupling-carrying profile bar as shown in FIG. 5a, likewise in the uncoupled position.
Figure 6A:
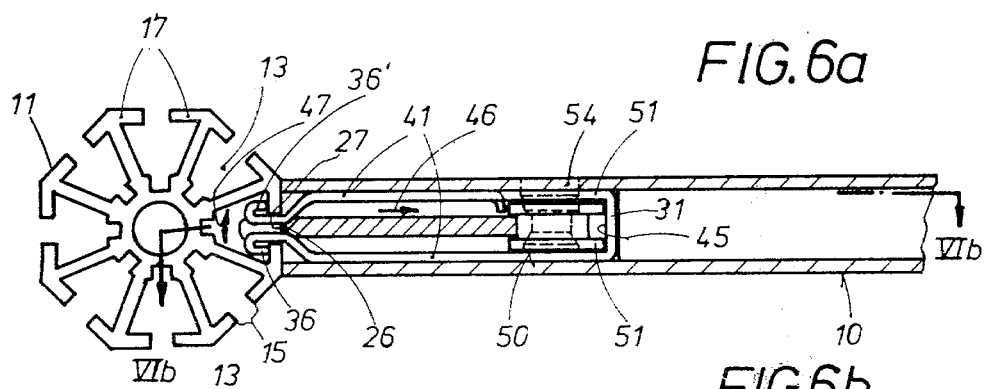
FIG. 6a is a view corresponding to FIG. 5a but in the completely coupled position of the bars.
Figure 6B:
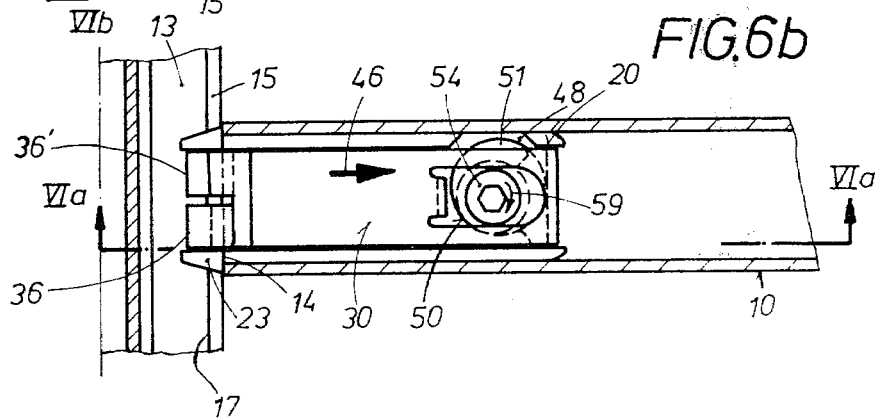
FIG. 6b shows a longitudinal sectional side view of the profile bars corresponding to FIG. 5b but with the elements in the coupled position.

After being assembled, the component parts are in a starting position which is shown in greater detail in FIGS. 5a and 5b. The arm ends 35 which are provided with hooks and the coupling studs 23 protrude from the head end 14 of the tubular profile bar 10 in the manner already described in detail. The eccentric member 50 is thereby located in an initial or ineffectual position in which the cam lifts are turned away from the web or bight 31 at the apex of the U-shaped leaf-spring 30 (FIG. 5a). The spring elasticity inherent in the arms 32 of the U-shaped leaf-spring 30 tends to bias the arm ends 35 together. The aforesaid sloping portions 33 of the arms of the U-shaped leaf-spring push against the two sloping surfaces of the wedge 26 at the outer end of the longitudinal central wall 21 so that in this pressed-together condition, the hook ends 36, 36' are pushed out to the greatest degree due to the longitudinal direction component of the wedge surfaces 26. As FIG. 5b shows, the hook ends project beyond the ends of the stationary coupling studs 23 on the bearing member 20. In addition, this pushing-out of the arm ends 35 is guaranteed by an entraining lug 44 (FIGS. 4, 5a) which is integral with the inside of at least one of the two arms 32 and which projects into the path of rotation of the eccentric member 50. This lug 44 is formed of the same material used for the leaf-spring 30 and results from the formation of the window 43 in that a marginal strip is bent inwardly to define the lug 44. A cam plate 51 slides along the entraining lug 44 and urges the U-shaped leaf spring 30 as a whole to move into its outwardly pushed position. The "uncoupled" position is one in which the coupling ends 35 protruding from the tubular profile bar 10 are capable of being freely inserted into the interior of the column 11 or removed therefrom, through the slot opening 15. The coupling studs 23 serve to align the bar 10 with the path of the longitudinal slot 13 of the bar 11 and also provide the press fit already mentioned.

In order to establish the coupling between the two bars 10 and 11, it is necessary only to rotate the eccentric member 50 so that in the aforesaid members moving into their coupling position shown in FIGS. 6a and 6b. For this purpose, the insert 54 is rotated by a socket wrench or the like in the direction of the arrow 59 in FIG. 6b. This causes the two cam plates 51 to engage and displace the inside face 45 of the web 31 of the U-shaped spring. The eccentric member 50 presses the U-shaped leaf spring at its rear web 31 rearwardly, as can be seen particularly in FIG. 4, resulting in a longitudinally inward movement of the leaf-spring 30 in the direction of the arrow 46. Then, however, the aforesaid sloping portions 33 of the two arms 32 move along the wedge 26 which is stationary on the bearing member 20. The tip 27 of the wedge strikes the point of intersection 37 or point of contact of the two arm ends 35 and spreads them apart in the direction of the double-headed arrow 47 shown in FIG. 6a. As a result, the arm ends 35 are not only pushed inwardly past the points of the coupling studs 23, as evidenced by comparison of FIG. 5b with FIG. 6b, but also laterally to the side, whereby their hook ends 36, 36' are pressed apart and engaged behind the undercut slot wall 17 of the bar 11. The slot wall 17 located on both sides of the slot aperture 15 is, during the aforesaid pushing-in movement 46, pressed against the head end 14 of the profile bar 10 by the inwardly traveling hook ends 36, 36' which have been spread apart behind it. The slot wall 17 is pressed between the hook ends 36, 36' and the end face 14 of the bar 10. An extremely stable securement is achieved. The coupling studs 23 which are at a considerable distance from one another preclude an axial rotation of the profile bar 10 in the longitudinal slot 13.

During this transition from the uncoupled position in FIG. 5a into the coupling position shown in FIG. 6a, the U-shaped leaf spring which takes the form of a pair of tongs, opens up at its arm ends 35. It is worth noting that the portions 41 of the arms which are still inclined in the uncoupling position (FIG. 5a), become pressed apart by the wedge 26 which is forced against the preceding inclined portions 33 in the coupling mode such that they are virtually parallel with the side wall of the profile bar 10 (FIG. 6a). As a result, high spring forces are attainable in the region in which the hook ends 36, 36' are spread apart from each other.

As can be seen particularly in FIG. 1, one flange 22 of the T is, in the profile of the bearing member 20, provided with a cut-out 48 on both sides of the longitudinal central wall 21 so that upon the rotation shown in FIG. 6b, the cam plates 51 located on both sides of the wall 21 can rotate. This makes it possible to exert on the leaf-spring 30 an extreme inwards stroke 46 without intolerably increasing the dimensions and without foregoing the symmetrical disposition. The other areas of the T flanges 22 are sufficient for guidance of the tong-shaped leaf-spring 30 during its longitudinal movement 46. The other flange 22 of the T which is opposite the cut-out 48 has an inner surface 49 which serves as an abutment for the eccentric member 50 when the cams thereof are in the other inoperative position shown in FIG. 5b which defines the uncoupled position of the two bars. As a result, on the one hand, a considerable cam travel and a considerable angle of rotation of the eccentric member 50 can be achieved and on the other hand the starting position of the rotatable cam member 50 is clearly determined by this abutment face in the uncoupled position.

It will be appreciated that a convenient coupling is achieved by the present invention. The eccentric is actuated remote from the point of intersection of the bars to minimize interference with such actuation. The holding member carries two hooked arms to maximize the coupling effect. The wedge is situated proximate such point of intersection to optimize the spreading apart of the holding member. The hooks occupy a very narrow space when urged together to simplify insertion and removal relative to the bar which they are to grip, and yet are spread considerably far apart in the locking mode to maximize the coupling effect. When the holding arms are spread apart, they are also being moved longitudinally inwardly into their carrier bar, thereby drawing the other bar tightly against the carrier bar. The coupling studs simplify the coupling action by producing proper alignment between the two bars. The T-shaped profile of the bearing member results in a non-rotatable mounting thereof within the carrier bar, which result is enhanced by the preferred double-T (i.e., I-shaped) profile of the bearing member.

Although the invention has been described in connection with a preferred embodiment thereof, it will be appreciated by those skilled in the art that modifications, substitutions, additions and deletions may be made without departing from the spirit and scope of the invention as defined in the appended claims.

What is claimed is:

1. In a frame assembly of the type comprising separate, interconnected bars, of which at least some have undercut longitudinal slots which lockingly receive the coupling ends of coupling members that project from ends of other bars, said other bars each having a bearing member carrying a transversely oriented eccentric member which is rotatably operable from one external face of said other bar, and a holding member which can be displaced longitudinally and laterally in response to rotation of the eccentric member, the holding member having a hook-shaped coupling end which, in the coupled position, engages in one of said undercut longitudinal slots, the improvement wherein said bearing member has a longitudinal central wall, said holding member including a tongs-shaped leaf-spring comprising a pair of arms joined at one end by a web, the free ends of the arms forming holding means, an inner end portion of said central wall of said bearing member including a recess for housing said eccentric member, an outer end of said bearing member having a wedge portion which extends as far as said longitudinal slot when the bars are coupled, an inside surface of said leaf-spring web defining an engagement surface for said eccentric member to displace said holding member, said two arms of said leaf-spring having oppositely directed hooked ends and convergent sloping portions disposed adjacent said wedge portion which are spread apart by said wedge portion when the holding member is displaced inwardly by said eccentric member.

2. A frame assembly according to claim 1, wherein in the uncoupled position, said sloping portions of said arms of said leaf-spring intersect each other in front of the tip of said wedge portion, and said hooked ends are being directed towards each other.

3. A frame assembly according to claim 1, wherein said hooked arm ends criss-cross and are each accommodated by a cut-out in the other arm.

4. A frame assembly according to claim 1, wherein in the uncoupled position, said two hooked ends of said arms are disposed between fixed coupling studs which project from the end of said other bar and which have a maximum width corresponding to the inside width of the longitudinal undercut slots.

5. A frame assembly according to claim 4, wherein said coupling studs are integrally formed on said bearing member, said studs being tapered toward one another and having at their bases a press-fit relationship in relation to said slots.

6. A frame assembly according to claim 4, wherein said coupling studs are configured to pass beyond the opening in said other bar and include shoulders which abut the end of said other bar.

7. A frame assembly according to claim 1, wherein said bearing member has an I-shaped cross-section, the web of the I forming said longitudinal central wall.

8. A frame assembly according to claim 1, wherein said recess in said longitudinal central wall is circular and has an opening facing said leaf-spring web, said opening being smaller than the diameter of said recess.

9. A frame assembly according to claim 7, wherein a flange of said I-sectional bearing member has a recess in the path of rotation of the eccentric member, the other flange arranged to abut said eccentric member to limit the angle of rotation of the eccentric member.

10. A frame assembly according to claim 1, wherein in the uncoupled condition said two arms of said leaf-spring are spread apart over a portion of their length which is adjacent to said sloping portions.

11. A frame assembly according to claim 4, wherein in that the bearing member with its fixed coupling studs is formed from an elastically-resilient material.

12. A frame assembly according to claim 1, wherein on the inside of said arms of said leaf spring is a disposed a lug which projects into the path of rotation of the eccentric member.

13. A frame assembly according to claim 1, wherein said eccentric member has a bore for receiving an externally manipulable insert by means of which the eccentric member can be rotated and which insert is accessible by means of an aperture in a wall of said bar and which insert extends through an opening in one arm of said leaf-spring.

14. A frame assembly according to claim 13, wherein the periphery of said insert is splined, and the axial bore in said eccentric member has cooperating splines.

* * * * *